United States Patent
Lee et al.

(10) Patent No.: US 12,321,299 B2
(45) Date of Patent: Jun. 3, 2025

(54) STORAGE DEVICE FOR POS AND POS SYSTEM UTILIZING SAME

(71) Applicant: HANASIS CO., LTD., Suwon-si (KR)

(72) Inventors: Jung Yong Lee, Yongin-si (KR); Sung Ho Kim, Gunpo-si (KR); Hyun O Yun, Gwangmyeong-si (KR)

(73) Assignee: HANASIS CO., LTD., Suwon-si (KR)

( * ) Notice: Subject to any disclaimer, the term of this patent is extended or adjusted under 35 U.S.C. 154(b) by 48 days.

(21) Appl. No.: 17/794,793

(22) PCT Filed: Dec. 7, 2021

(86) PCT No.: PCT/KR2021/018434
§ 371 (c)(1),
(2) Date: Jul. 22, 2022

(87) PCT Pub. No.: WO2022/149738
PCT Pub. Date: Jul. 14, 2022

(65) Prior Publication Data
US 2023/0075658 A1 Mar. 9, 2023

(30) Foreign Application Priority Data
Jan. 5, 2021 (KR) .................. 10-2021-0000967

(51) Int. Cl.
*G06F 13/40* (2006.01)
*H01R 12/71* (2011.01)

(52) U.S. Cl.
CPC ........ *G06F 13/409* (2013.01); *G06F 13/4068* (2013.01); *H01R 12/716* (2013.01)

(58) Field of Classification Search
CPC .. G06F 13/409; G06F 13/4068; G06F 3/0688; H01R 12/716
See application file for complete search history.

(56) References Cited

U.S. PATENT DOCUMENTS 9,158,722 B1 * 10/2015 Jenkins ................. G06F 13/385
9,971,725 B2 * 5/2018 Kimura ..................... G06F 1/26
(Continued)

FOREIGN PATENT DOCUMENTS

KR 10-1997-0066593 10/1997
KR 20-1998-0058709 10/1998
(Continued)

OTHER PUBLICATIONS

International Search Report and Written Opinion of the International Searching Authority dated Mar. 11, 2022 in International Patent Application No. PCT/KR2021/018434.

*Primary Examiner* — Idriss N Alrobaye
*Assistant Examiner* — Richard B Franklin
(74) *Attorney, Agent, or Firm* — Bridgeway IP Law Group, PLLC; Jihun Kim

(57) ABSTRACT

Disclosed herein is a storage device for a POS. The storage device is coupled to a SATA connector that operates in conjunction with the control unit of the POS. The storage device includes: a case part including a circuit board in which a first arrangement area and a second arrangement area are formed; a first storage module disposed in the first arrangement area, and a second storage module disposed in the second arrangement area; a storage module coupling part including a first storage module coupling part and a second storage module coupling part; a main coupling part disposed at one end of the case part, and electrically connected such that the data of the POS is transmitted and received; and a data circuit unit disposed between the main coupling part and the storage module coupling part, and configured to provide a circuit for the transmission and reception of data.

5 Claims, 5 Drawing Sheets

(56) References Cited

U.S. PATENT DOCUMENTS

2018/0129432 A1* 5/2018 Kowles .................. G06F 1/1658
2018/0212377 A1* 7/2018 Zimmermann ........ H01R 24/64

FOREIGN PATENT DOCUMENTS

| KR | 10-2008-0071851 | 8/2008 |
| KR | 10-2009-0002236 | 1/2009 |
| KR | 10-2231038 | 3/2021 |

* cited by examiner

[FIG. 1]
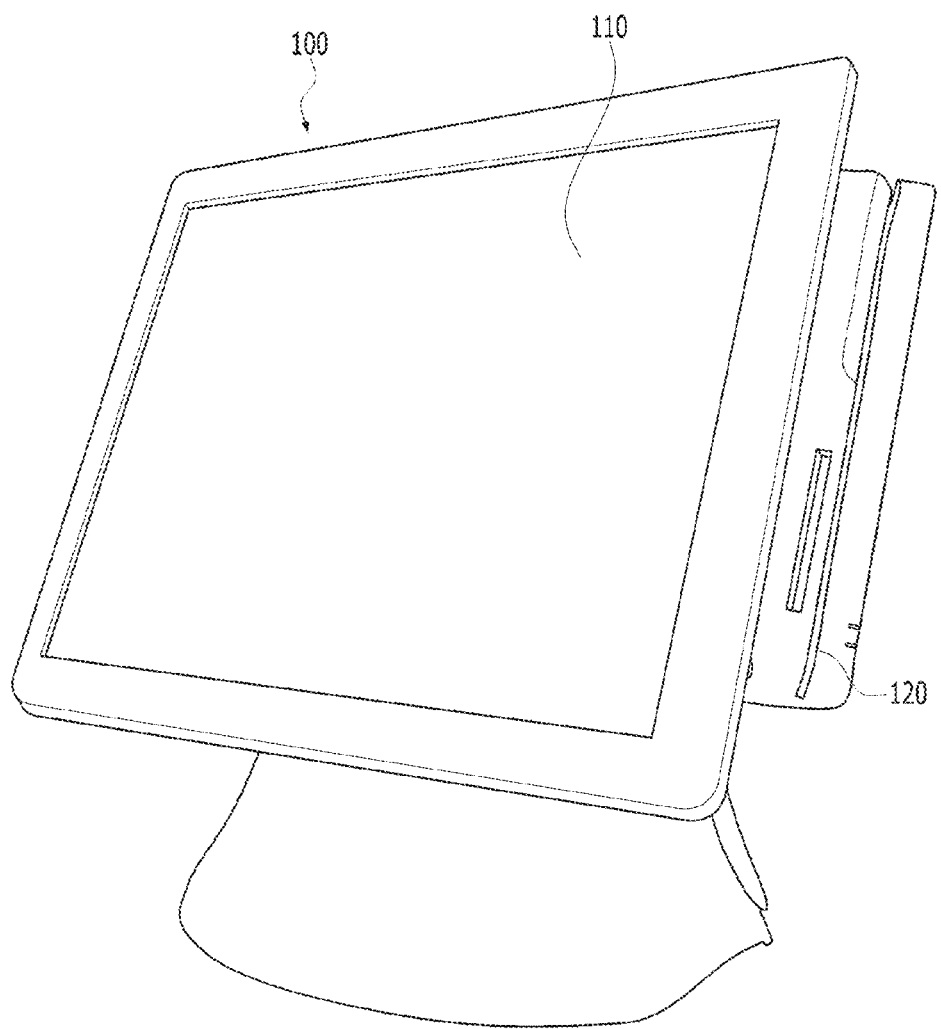

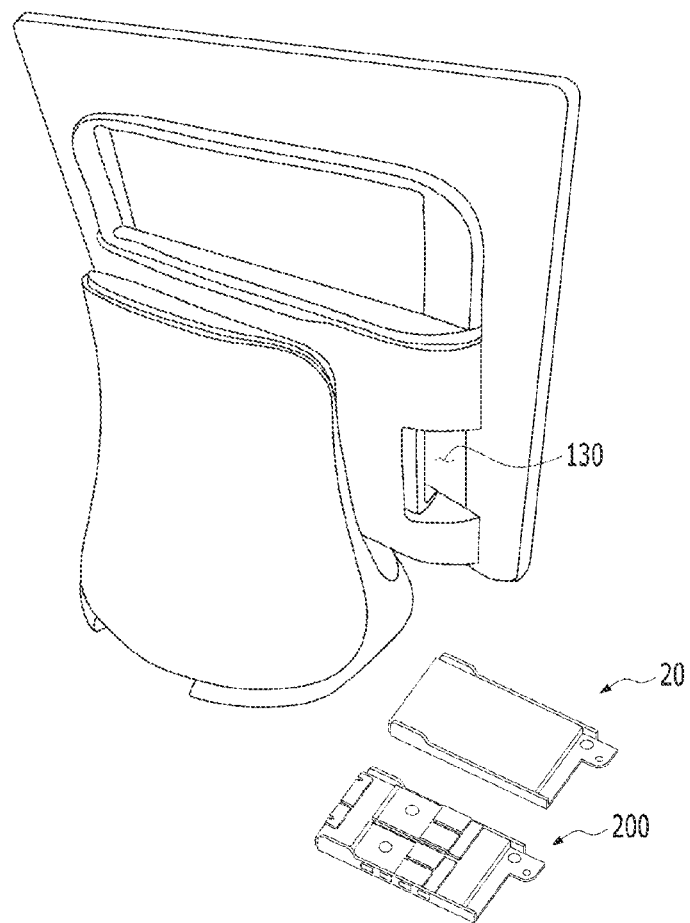
[FIG. 2]

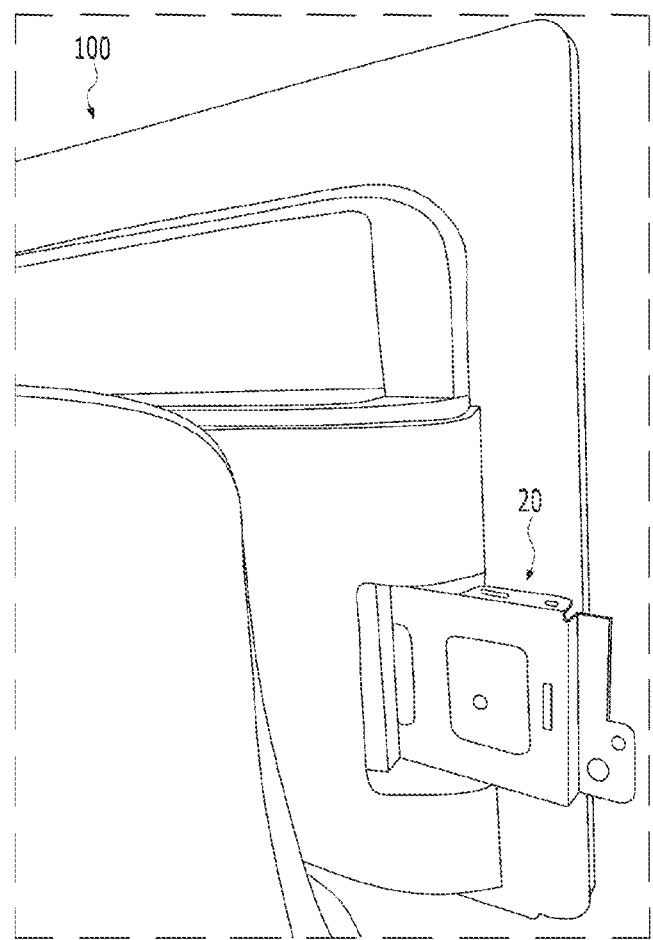
[FIG. 3]

[FIG. 4]
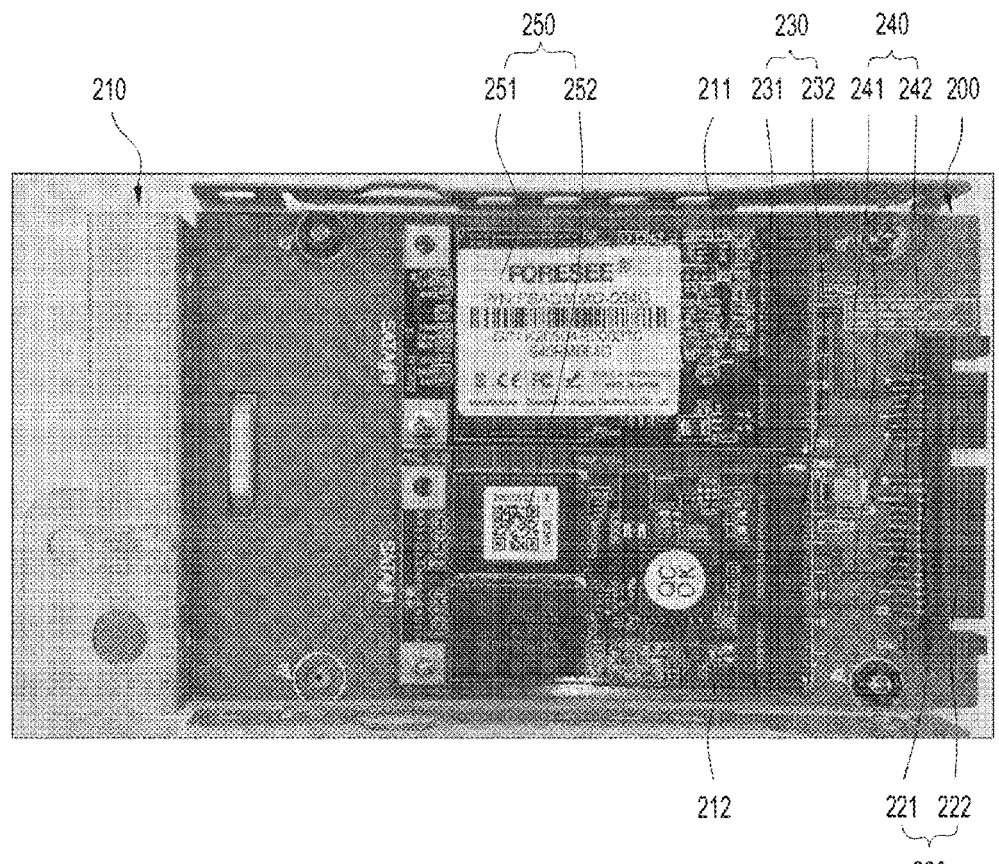
[FIG. 5]
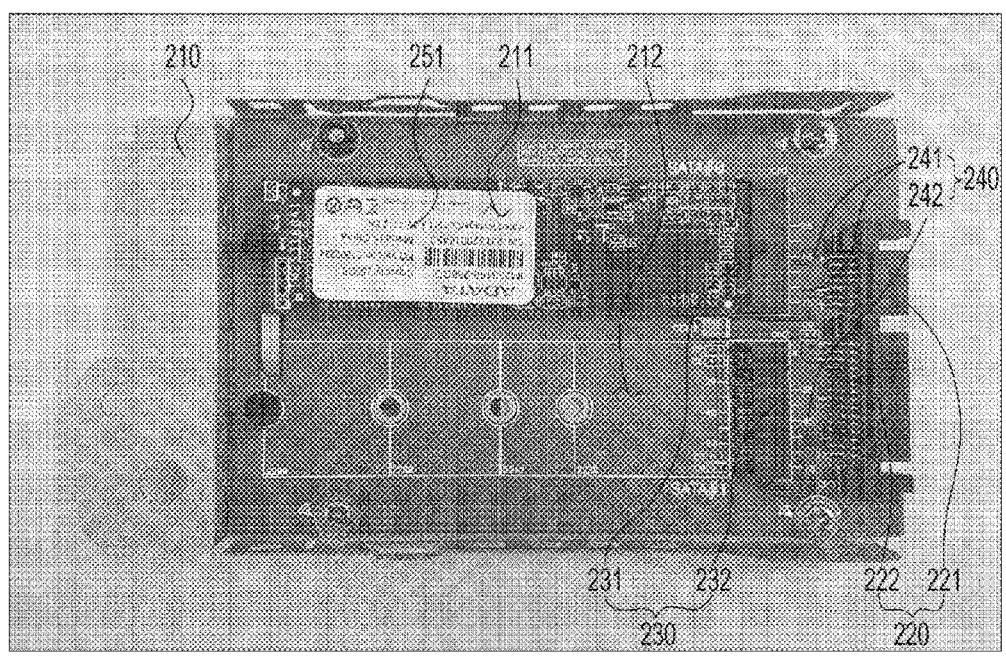

[FIG. 6]
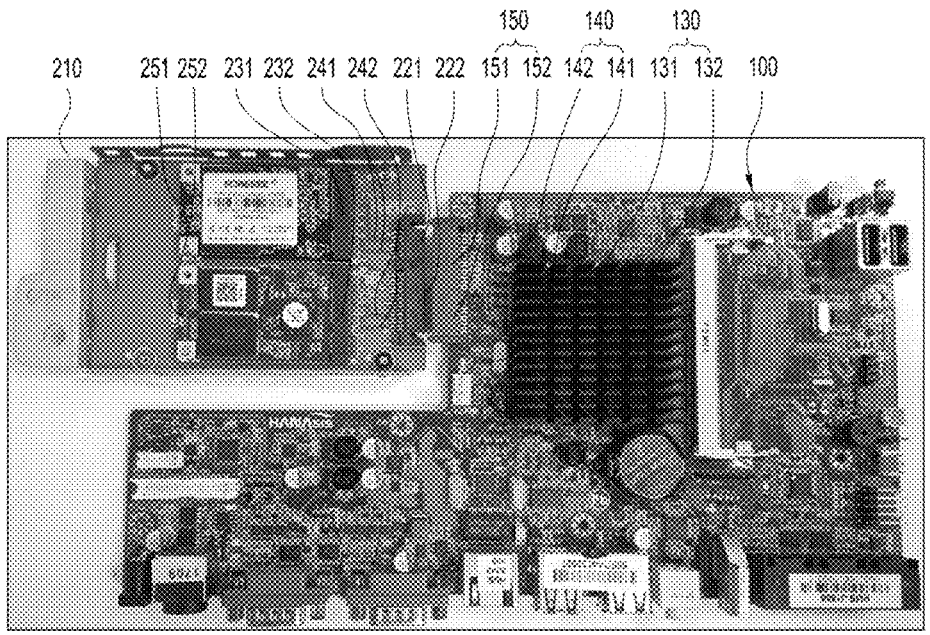
[FIG. 7]
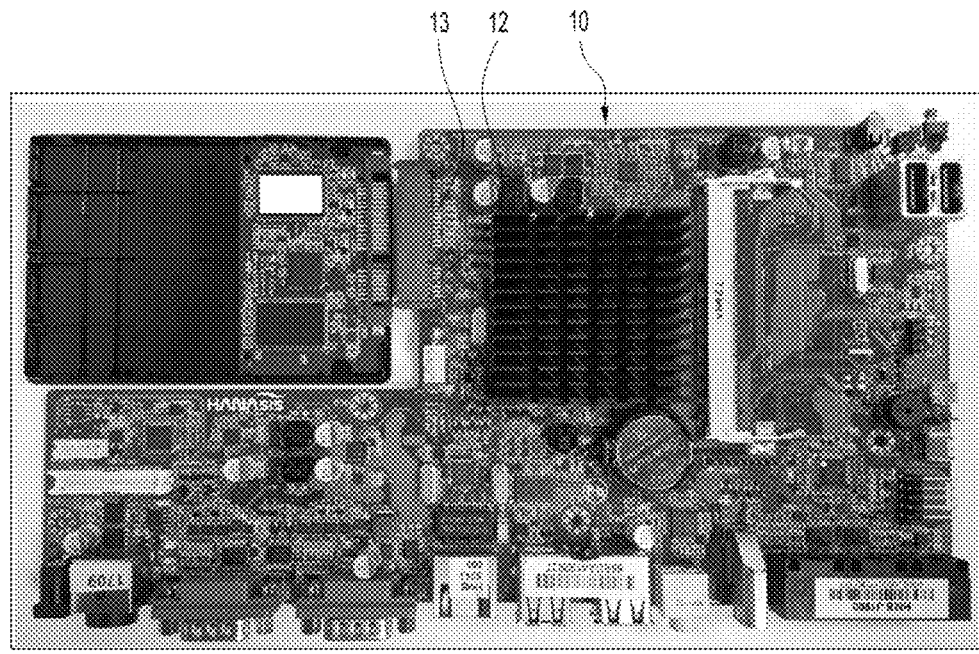

STORAGE DEVICE FOR POS AND POS SYSTEM UTILIZING SAME

TECHNICAL FIELD

The present invention relates to a storage device for a POS that enables a plurality of m-SATA or M.2 storage modules to be connected to a POS of an existing standard and then used, and also relates to a POS system utilizing the same.

BACKGROUND ART

A point of sales (POS) is an apparatus that can perform inventory management or sales management for payments made according to customers' purchases of products in a general wholesale or retail store.

The size of the global market of POSs is expected to grow at a compound annual growth rate (CAGR) of 9% during the forecast period from 2020 to 2024, and is expected to reach $3.9 billion in 2024. In particular, as the need for self-service POSs increases due to the recent increases in eating out and the frequency of use of convenience stores and marts, the growth thereof is being promoted.

In particular, a POS used in an offline store constitutes a system that manages not only simple payments but also inventory management, sales management, and user information management in an integrated manner. Users are increasingly reliant on POSs in stores.

The basic structure of a POS used in an offline store may include an input/output unit, a payment unit, a control unit, and a storage unit. In this case, the input/output unit is a means for outputting payment information or inventory management to the outside and allowing a user to input a payment amount, etc., and the payment unit is a means for enabling a user to make a payment through the consumer's payment means. In addition, the control unit is a means for transmitting and receiving information and controlling information at the same time by controlling the input/output unit, the payment unit, and the storage unit, and the storage unit is a means for storing information processed inside the POS.

A hard disk drive (HDD) or a solid state drive (SSD) may generally be used as a storage unit that is coupled to the conventional POS. As the quantity and quality of information currently controlled by POSs increase, users who use HDDs as storage units for the POSs are also gradually replacing them with SSDs. In the case of HDDs, 1.8-inch, 2.5-inch, and 3.5-inch sizes are generally used. Among these, the 2.5-inch size standard is generally used for POSs. Also in the case of SSDs, the 2.5-inch size standard is being used in POSs for the purpose of compatibility with HDDs.

In POSs, a connector for a SATA (Serial ATA) standard connection method, i.e., a SATA connector, is generally used as a connector for coupling a 2.5-inch HDD and SSD to each other. In the case of a SATA connector, it is a connector that enables a 2.5-inch HDD and SSD to be coupled in a universal manner, and is a standard used in most POSs.

FIG. 7 is a view showing the configuration of a POS system to which a conventional SSD storage device is coupled.

Referring to FIG.7, a data connector 12 and a power connector 13 are equivalent to a SATA connector when taken together. The SATA connector is disposed in a conventional POS system 10 and is a means in which both a conventional HDD connection method and an SSD connection method can be used. The SATA connector may be divided into the data connector 12 connected to a central processing unit for the purpose of data transmission and reception and the power connector 13 connected to a power supply unit for the purpose of power supply. In the case of an HDD, a separate disk is utilized, so that the connection to both the power connector 13 and the data connector 12 is essential. In the case of an SSD, supply power is not required, so that it is not connected to the power connector 13 but is connected only to the data connector 12 and then used.

However, the conventional POS connected to the storage unit by the SATA connector has the following problems.

First of all, since only one HDD or SSD can be installed for each SATA connector, there is a problem in that only one storage unit can be installed in one POS. When only one storage unit is installed, the demand for separately installing and managing user data and an operating system in the storage unit cannot be met, and it is impossible to back up a store's payment information and inventory information in real time by utilizing two storage units. Accordingly, there is a problem in that data cannot be recovered when an error occurs in the storage unit or the storage unit is damaged.

In order to prevent such a case, when the installation of an additional storage unit is required, there are the following two problems.

First of all, since only one HDD or SSD storage unit can be installed for each SATA connector, there is a problem in that it is necessary to additionally install a SATA connector on the motherboard of a POS in order to install an additional storage unit. In this case, there are problems in that the weight and volume of the POS itself increase due to the addition of the SATA connector and the size of the POS becomes unnecessarily large in order to obtain an additional arrangement area for the storage unit.

Furthermore, when the SATA connector installed on the already provided POS is replaced as a whole or a connector other than a SATA connector is installed, the already provided POS cannot be used or the hardware of the already provided POS, especially the structure of a main board, needs to be replaced as a whole. Accordingly, there are problems in that it is impossible for a user to use the POS during a replacement period and also additional costs are incurred.

Therefore, the development of a storage device dedicated to a POS in which two storage units can be connected through a conventional SATA connector is urgently required.

The prior art literature for the conventional storage device for a POS is as follows.

PRIOR ART LITERATURE

Patent Document

Korean Patent Application No. 10-2016-0076626 (title of the invention: Storage Device Mounting/Demounting Structure of POS)

DISCLOSURE

Technical Problem

The present invention has been conceived to overcome the above-described problems, and an object of the present invention is to provide a storage device for a POS in which two storage modules are disposed in a storage unit, and a POS system utilizing the same. However, the objects of the present invention are not limited to the above-described object, and one or more other objects may be derived from the following description.

Technical Solution

According to an embodiment of the present invention, there is provided a storage device for a POS, the storage device being coupled to a SATA connector that operates in conjunction with the control unit of the POS, the storage device including: a case part including a circuit board in which a first arrangement area and a second arrangement area spaced apart from each other are formed; a first storage module disposed in the first arrangement area and configured to store data, and a second storage module disposed in the second arrangement area and configured to store data; a storage module coupling part including a first storage module coupling part coupled to the first storage module and a second storage module coupling part coupled to the second storage module; a main coupling part disposed at one end of the case part, and electrically connected such that the data of the POS can be transmitted and received as the SATA connector is coupled; and a data circuit unit disposed between the main coupling part and the storage module coupling part, and configured to provide a circuit for the transmission and reception of data; wherein the first storage module and the second storage module include m-SATA SSDs or M.2 SSDs; and wherein data input to the POS is transmitted and received to and from one or more of the first storage module and the second storage module through the main coupling part, the data circuit unit, and the storage module coupling part.

Furthermore, the main coupling part may include: a first main coupling part configured to transmit and receive data from the first storage module coupling part to the control unit of the POS; and a second main coupling part configured to transmit and receive data from the second storage module coupling part to the control unit of the POS.

Furthermore, the data circuit unit may include: a first data circuit unit configured to provide a circuit for the transmission and reception of data between the first storage module coupling part and the first main coupling part; and a second data circuit unit configured to provide a circuit for the transmission and reception of data between the second storage module coupling part and the second main coupling part.

According to another embodiment of the present invention, there is provided a POS system including: an input/output unit configured to input a signal and output information to an outside; a control unit configured to control transmission/reception of data and process data; a storage unit configured to store data transmitted and received from the control unit; and a SATA connector configured such that the storage unit is detachably coupled thereto and data processed by the control unit is transmitted and received to the storage unit; wherein the storage device includes: a case part including a circuit board in which a first arrangement area and a second arrangement area spaced apart from each other are formed; a first storage module disposed in the first arrangement area, configured to store data, and including an m-SATA SSD or an M.2 SSD, and a second storage module disposed in the second arrangement area, configured to store data, and including an m-SATA SSD or an M.2 SSD; a storage module coupling part including a first storage module coupling part coupled to the first storage module and a second storage module coupling part coupled to the second storage module; a main coupling part disposed at one end of the case part, and electrically connected such that the data of the POS can be transmitted and received as the SATA connector is coupled; and a data circuit unit disposed between the main coupling part and the storage module coupling part, and configured to provide a circuit for the transmission and reception of data.

Furthermore, the control unit may include: a central processing unit configured to control the input/output unit and process data; and an interface configured to generate a signal for transmitting and receiving data to and from the storage unit; and the interface may include: a main interface configured to generate a signal for transmitting and receiving first data to be stored in the first storage module; and an auxiliary interface configured to generate a signal for transmitting and receiving second data to be stored in the second storage module.

Furthermore, the SATA connector may include: a first SATA connector connected to the main interface, and configured to transmit and receive the first data; and a second SATA connector connected to the auxiliary interface, and configured to transmit and receive the second data; and the main coupling part may include: a first main coupling part coupled to the first SATA connector to transmit and receive the first data to and from the first storage module coupling part; and a second main coupling part coupled to the second SATA connector to transmit and receive the second data to and from the second storage module coupling part.

Furthermore, the first data may be transmitted and received from the main interface to the first storage module through the first SATA connector and the first main coupling part; and the second data may be transmitted and received from the auxiliary interface to the second storage module through the second SATA connector and the second main coupling part.

Advantageous Effects

The storage device for a POS according to the present invention and the POS system utilizing the same have the following effects:

Above all, the two storage modules rather than one storage module are disposed in the storage device. In particular, as m-SATA SSDs or M.2 SSDs having high storage speed and stability are used as the storage modules, the data of the POS may be used advantageously in the following three aspects:

First, as a user separately uses the management data stored in the POS system in relation to a store and operating system data related to an operating system, there is an effect in that the management data of the store may be efficiently used in the one storage module.

Second, when it is necessary to separate and manage store management data as in the case where a user operates two businesses in a single store, or when it is necessary to separately manage sales data and management data, the data to be stored is determined for each storage module, and thus there is an effect in that data may be classified and used for each storage module.

Third, in the process of using the POS system, a user stores data in one storage module and uses the other storage module as an additional auxiliary data storage space or performs real-time backup via RAID, so that there is an effect of stably protecting data even when one storage module is damaged.

Furthermore, since the conventional POS system is utilized, there is an effect in that the POS system itself may use the conventionally used 2.5-inch SSD and the storage device according to the embodiment of the present invention in a universal manner. In other words, since a user uses the storage device, the conventionally used space of the existing storage device of the 2.5-inch SSD may be used as it is without the inconvenience of separately constructing the existing storage device of the 2.5-inch SSD internally or externally, so that there is an effect of overcoming the inconvenience of having to construct an additional space separately.

Furthermore, in the circuit board of the POS system used in the POS system, only the second SATA connector portion of the SATA connector portions, to which the conventional power supply is connected, is connected to the interface, so that a structural change is easy and a long time is not required, with the result that there is an effect in that the existing POS system may be easily reused.

DESCRIPTION OF DRAWINGS

FIG. 1 is a front perspective view of a POS system to which a storage device for a POS according to an embodiment of the present invention is coupled;

FIG. 2 shows a rear perspective view of a POS system according to an embodiment of the present invention and a perspective view showing an SSD storage device coupled thereto and the storage device of the present invention;

FIG. 3 is a perspective view showing a situation in which the storage device for a POS according to the embodiment of the present invention is coupled to the rear side of the POS system;

FIG. 4 is a view showing the configuration of a storage device for a POS according to an embodiment of the present invention in which storage modules are m-SATA SSDs;

FIG. 5 is a view showing the configuration of a storage device for a POS according to an embodiment of the present invention in which storage modules are M.2 SSDs;

FIG. 6 is a view showing the configuration of a POS system to which a storage device for a POS according to an embodiment of the present invention is coupled; and FIG. 7 is a view showing the configuration of a POS system to which a conventional SSD storage device is coupled.

MODE FOR INVENTION

Embodiments of the present invention will be described in detail below with reference to the accompanying drawings. The embodiments to be described below are directed to a storage device for a POS which may be installed in a conventional POS and in which an additional auxiliary data storage unit capable of RAID backup and the separation of operating system and data storage through two storage modules is disposed.

The embodiments and drawings to be introduced below are provided as examples in order to sufficiently convey the spirit of the present invention to those skilled in the art. Furthermore, unless the technical and scientific terms used in the present invention have other definitions, they have the meanings commonly understood by those having ordinary skill in the art to which the present invention pertains. In the following description and the accompanying drawings, descriptions of well-known functions and configurations that may unnecessarily obscure the gist of the present invention will be omitted.

In addition, based on FIG. 4, an up direction is defined as an upward direction, a down direction is defined as a downward direction, a right direction is defined as one side, and a left direction is defined as the other side. However, it should be noted that this is a reference orientation for ease of description, but the present invention is not limited thereto.

The technical spirit of the present invention will be described in greater detail below by using the accompanying drawings. Since the accompanying drawings are merely examples shown in order to describe the technical spirit of the present invention in greater detail, the technical spirit of the present invention is not limited to the shapes shown in the accompanying drawings.

FIG. 1 is a front perspective view of a POS system to which a storage device for a POS according to an embodiment of the present invention is coupled, FIG. 2 shows a rear perspective view of a POS system according to an embodiment of the present invention and a perspective view showing an SSD storage device coupled thereto and the storage device of the present invention, and FIG. 3 is a perspective view showing a situation in which the storage device for a POS according to the embodiment of the present invention is coupled to the rear side of the POS system.

In addition, FIG. 4 is a view showing the configuration of a storage device for a POS according to an embodiment of the present invention in which storage modules are m-SATA SSDs, FIG. 5 is a view showing the configuration of a storage device for a POS according to an embodiment of the present invention in which storage modules are M.2 SSDs, FIG. 6 is a view showing the configuration of a POS system to which a storage device for a POS according to an embodiment of the present invention is coupled, and FIG. 7 is a view showing the configuration of a POS system to which a conventional SSD storage device is coupled.

The structure of a POS system 100 will be first described with reference to FIGS. 1 to 6. The POS system 100 may include an input/output unit 110, a payment unit 120, a control unit 130, a connection circuit unit 140, and a SATA connector 150. In this case, the input/output unit 110 is a means for outputting payment information, inventory management, etc. to the outside and allowing a user to input a payment amount, etc., the payment unit 120 is a means for enabling a user to make a payment through the consumer's payment means, the control unit 130 is a means for controlling the input/output unit 110 and the payment unit 120, receiving information from the storage device 200 and controlling the information, the connection circuit unit 140 is a means connected to the control unit 130 and a means for transmitting and receiving data to and from the storage device 200 when the storage device 200 is connected to the POS system 100, and the SATA connector 150 is a means conforming to the SATA standard and a means for being coupled to the storage device 200. The control unit 130, the connection circuit unit 140, and the SATA connector 150 will be described in detail below.

More specifically, the control unit 130 of the POS system 100 may transmit and receive data to and from the storage device 200 coupled to the SATA connector 150, and may process data. More specifically, the control unit 130 of the POS system 100 may include a CPU, which is a central processing unit that controls the input/output unit 110 and the payment unit 120, and an interface that may transmit and receive data to and from the storage device 200 while operating in conjunction with the CPU. In this case, the interface may include a main interface 131 and an auxiliary interface 132. More specifically, when the storage device 200 has one storage module 250, the main interface 131 may be connected to the storage module 250. In contrast, when the storage modules 250 of the storage device 200 include a first storage module 251 and a second storage module 252, the first storage module 251 is connected to the main interface 131, and the second storage module 252 may be connected to the auxiliary interface 132. A detailed description thereof will be given later.

The connection circuit unit 140 is a means connected between the SATA connector 150 and the control unit 130 for the purpose of data transmission and reception. More specifically, the connection circuit unit 140 may include a first connection circuit unit 141 connecting one side (hereinafter a "first SATA connector 151") of the SATA connector 150 to the main interface 131, and a second connection circuit unit 142 connecting the other side (hereinafter a "second SATA connector 152") of the SATA connector 150 and the auxiliary interface 132. In the case of the conventional POS system 100, the first SATA connector 151 of the SATA connector 150 is connected to the main interface 131 of the controller 130 for the purpose of data transmission and reception, and the second SATA connector 152 is connected to a power supply for the purpose of power supply. In contrast, in the case of the POS system 100 using the storage device 200 according to the embodiment of the present invention, the second connection circuit unit 142 is connected to the auxiliary interface 132, and thus all of them may be utilized for data transmission and reception.

The SATA connector 150 is a coupling means to which the storage device 200 is coupled so that data in the storage device 200 can be transmitted and received to and from the control unit 130 through the connection circuit unit 140. In the SATA connector 150, the first SATA connector 151 disposed on one side and the second SATA connector 152 disposed on the other side may be disposed in series. In this case, the second SATA connector 152 may have a longer extension length than the first SATA connector 151.

Furthermore, the first SATA connector 151 may have a plurality of first connector pins disposed in series, and the second SATA connector 152 may also have a plurality of second connector pins disposed in series. In this case, all the plurality of first connector pins may be coupled to the first main coupling part 221 of a main coupling part 220 to be described later, and the plurality of second connector pins may be partially coupled to the second main coupling part 222 of the main coupling part 220 to be described later. The reason for this is that the second connector pins formed in the second SATA connector 152 are connected with the conventional power supply and then used, so that a number of second connector pins larger than the number of second connector pins required for data transmission and reception may be arranged, with the result that an attempt is made to achieve data transmission and reception by using only some of the second connector pins.

Furthermore, the first SATA connector 151 may transmit the data of the first storage module 251 of the storage device 200 to the main interface 131 of the control unit 130 through the first connection circuit unit 141. The second SATA connector 152 may transmit the data of the second storage module 252 of the storage device 200 to the auxiliary interface 132 of the control unit 130 through the second connection circuit unit 142.

Accordingly, the conventional 2.5-inch SSD device or the storage device 200 for the POS system 100 according to an embodiment of the present invention may be coupled to the SATA connector 150 of the POS system 100 and then operated. In the case of a 2.5-inch HDD, power supply is impossible, so that it cannot be coupled and operated, with the result that it is impossible to supply electricity to the 2.5-inch HDD, thereby preventing physical damage.

Furthermore, the POS system 100 according to an embodiment of the present invention may further include a storage unit for the POS system 100. The storage unit will be defined and described as a storage device 200.

Referring to FIGS. 4 to 6, the storage device 200 for the POS system 100 mounted on the POS system 100 according to an embodiment of the present invention may include: a case part 210 configured to provide an arrangement area for placing the two storage modules 250 therein, and to have a circuit board mounted therein; the main coupling part 220 disposed at one end of the case part 210, and connected to the SATA connector 150 of the POS system 100; a storage module coupling part 230 disposed at one end of the arrangement area of the case part 210, and including a first storage module coupling part 231 and a second storage module coupling part 232 for the purpose of the coupling of the storage modules 250; a data circuit unit 240 connected from the first storage module coupling part 231 and the second storage module coupling part 232 to the main coupling part 220, and configured to provide a circuit for transmitting the data of the storage modules 250; and the storage modules 250 including the first storage module 251 disposed in the arrangement area and coupled to the first storage module coupling part 231, and the second storage module 252 disposed in the arrangement area and connected to the second storage module coupling part 232. The individual components will be described in detail below.

The case part 210 may have a space for arranging the storage modules 250 therein, and may be formed to have the same standard as the conventional 2.5-inch HDD or SSD. In other words, the outside of the case unit 210 may be formed to have the same size and shape as the 2.5-inch HDD or SSD. Accordingly, the conventional 2.5-inch SSD device and the case part 210 may be coupled to the POS system 100.

Furthermore, the arrangement area of the case part 210 may be formed as a first arrangement area 211 in which the first storage module 251 of the storage modules 250 is disposed and a second arrangement area 212 in which the second storage module 252 is disposed. In this case, the first arrangement area 211 and the second arrangement area 212 may be arranged to be spaced apart from each other by a predetermined distance in a vertical direction. The first storage module coupling part 231 may be disposed at one end of the first arrangement area 211, and the second storage module coupling part 232 may be disposed at one end of the second arrangement area 212. In other words, the storage modules 250 including the first storage module 251 and the second storage module 252 may be disposed in the arrangement area inside the 2.5-inch case part 210.

The main coupling part 220 is a means disposed at one end of the case unit 210 and coupled to the SATA connector 150 of the POS system 100 to connect the POS system 100 and the storage device 200. In detail, the main coupling part 220 may include the first main coupling part 221 formed in a shape corresponding to that of the first SATA connector 151 and coupled to the first SATA connector, and the second main coupling part 222 formed in a shape corresponding to that of the second SATA connector 152 and coupled to the second SATA connector 152. In other words, the second main coupling part 222 may have a longer extension length than the first main coupling part 221.

The storage module coupling part 230 is a means to which the storage modules 250, i.e., m-SATA SSDs or M.2 SSDs, may be coupled. More specifically, the storage module (250) coupling part may include m-SATA connectors or M.2 SSD connectors conforming to the m-SATA standard or the M.2 SSD standard. Furthermore, the storage module coupling part 230 includes the first storage module coupling part 231 to which the first storage module 251 is coupled, and the second storage module coupling part 252 to which the second storage module 252 is coupled. In this case, the first storage module coupling part 231 may be disposed at one end of the first arrangement area 211 so that the first storage module 251 can be coupled thereto, and the second storage module coupling part 232 may be disposed at one end of the second arrangement area 212 so that the second storage module 252 can be coupled thereto.

FIG. 4 shows a storage device in the form in which storage modules are m-SATA SSDs, and FIG. 5 shows a storage device in the form in which storage modules are M.2 SSDs. The two devices partially differ only in the configurations of storage modules and a storage module coupling part, but the rest of the configuration of the device is the same. Redundant descriptions thereof will be omitted.

The data circuit unit 240 is a means that provides a circuit that is connected from the storage module coupling part 230 to the main coupling part 220 so that data stored in the storage modules 250 can be transmitted and received to and from the main coupling part 220. More specifically, the data circuit unit 240 may include the first data circuit unit 241 connected from the first storage module coupling part 231 to the first main coupling part 221, and the second data circuit unit 242 connected from the second storage module coupling part 232 to the second main coupling part 222. The first data circuit unit 241 may provide a circuit through which data stored or to be stored in the first storage module 251 is transmitted and received, and the second data circuit unit 242 may provide a circuit through which data stored or to be stored in the second storage module 252 is transmitted and received.

The storage modules 250 may include the first storage module 251 coupled to the first storage module coupling part 231 and configured to store data therein, and the second storage module 252 coupled to the second storage module coupling part 232 and configured to store data therein. The first storage module 251 and the second storage module 252 may include m-SATA SSDs or M.2 SSDs. As the storage modules 250 are composed of m-SATA SSDs or M.2 SSDs, two SSDs may be disposed in the case part 210 having a size that allows a general SSD to be accommodated therein. Accordingly, the first storage module 251 and the second storage module 252 may be organized via LAID such that data can be backed up or a storage module can be utilized as an additional auxiliary data storage space.

An operation in which data is transmitted and received between the storage device 200 for the POS system 100 and the POS system 100, to which the storage device 200 is coupled, according to an embodiment of the present invention will be described in detail below.

First, data inside the POS system 100 may be coupled to the storage device 200 by coupling the storage device 200 to the POS system 100. More specifically, in order to couple the storage device 200 to the POS system 100, the main coupling part 220 of the storage device 200 may be coupled to the SATA connector 150 of the POS system 100. In this case, the first main coupling part 221 may be coupled to the first SATA connector 151, and the second main coupling part 222 may be coupled to the second SATA connector 152.

In this state, data may be stored in the storage modules 250 by operating the POS system 100. The path of data generated by the POS system 100 will be described in detail. First, data generated by the POS system 100 may be classified as first data to be stored from the main interface 131 of the control unit 130 to the first storage module 251 of the storage device 200, and second data to be stored from the auxiliary interface 132 of the control unit 130 to the second storage module 252 of the storage device 200.

A step in which the first data and the second data are stored in the storage device 200 will be described.

The first data may be transmitted from the main interface 131 of the control unit 130 to the first SATA connector 151 through the first connection circuit unit 141. In this case, data may be received through the first main coupling part 221 of the main coupling part 220 of the storage device 200, and first data received by the first main coupling part 221 may be transmitted to the first storage module 251, coupled to the first storage module coupling part 231, through the first data circuit unit 241.

Furthermore, the second data may be transmitted from the auxiliary interface 132 of the control unit 130 to the second SATA connector 152 through the second connection circuit unit 142. In this case, data may be received through the second main coupling part 222 of the main coupling part 220 of the storage device 200, and second data received by the second main coupling part 222 may be transmitted to the second storage module 252, coupled to the second storage module coupling part 232, through the second data circuit unit 242.

In contrast, a step in which first data and second data stored in the storage device 200 are transmitted to the POS system 100 will be described.

The first data stored in the first storage module 251 of the storage device 200 may be transmitted to the first main coupling part 221 through the first data circuit unit 241 connected to the first storage module coupling part 231. In this case, the first data is received from the main interface 131 of the controller 130 through the first connection circuit unit 141 connected to the first SATA connector 151 of the SATA connector 150 of the POS system 100. Accordingly, the POS system 100 may utilize the first data.

In addition, the second data stored in the second storage module 252 of the storage device 200 may be transmitted to the second main coupling part 222 through the second data circuit unit 242 connected to the second storage module coupling part 232. In this case, the second data is received from the auxiliary interface 132 of the control unit 130 through the second connection circuit unit 142 connected to the second SATA connector 152 of the SATA connector 150 of the POS system 100. Accordingly, the POS system 100 may utilize the second data.

According to the above-described POS system 100 and the storage device 200 coupled thereto, the following effects are achieved:

Above all, the two storage modules 250 rather than one storage module 250 are disposed in the storage device 200. In particular, as m-SATA SSDs having high storage speed and stability are used as the storage modules 250, the data of the POS system 100 may be used advantageously in the following three aspects:

First, as a user separately uses the management data stored in the POS system 100 in relation to a store and operating system data related to an operating system, there is an effect in that the management data of the store may be efficiently used in the one storage module 250.

Second, when it is necessary to separate and manage store management data as in the case where a user operates two businesses in a single store, or when it is necessary to separately manage sales data and management data, the data to be stored is determined for each storage module 250, and thus there is an effect in that data may be classified and used for each storage module 250.

Third, in the process of using the POS system 100, a user stores data in one storage module 250 and uses the other storage module 250 as an additional auxiliary data storage space or performs real-time backup via RAID, so that there is an effect of stably protecting data even when one storage module 250 is damaged.

Furthermore, since the conventional POS system 100 is utilized, there is an effect in that the POS system 100 itself may use the conventionally used 2.5-inch SSD and the storage device 200 according to the embodiment of the present invention in a universal manner. In other words, since a user uses the storage device 200, the conventionally used space of the existing storage device 20 of the 2.5-inch SSD may be used as it is without the inconvenience of separately constructing the existing storage device 20 of the 2.5-inch SSD internally or externally, so that there is an effect of overcoming the inconvenience of having to construct an additional space separately.

Furthermore, in the circuit board of the POS system 100 used in the POS system 100, only the second SATA connector (152) portion of the SATA connector (150) portions, to which the conventional power supply is connected, is connected to the interface, so that a structural change is easy and a long time is not required, with the result that there is an effect in that the existing POS system 100 may be easily reused.

So far, the preferred embodiments of the present invention have been mainly described. It will be understood by those having ordinary skill in the art to which the present invention pertains that the present invention may be implemented in a modified form without departing from the essential features of the present invention. Therefore, the disclosed embodiments are to be taken into consideration in an illustrative sense rather than a limitative sense. The scope of the present invention is defined in the claims rather than the foregoing description, and all differences falling within a range equivalent thereto should be construed as being included in the present invention.

The invention claimed is:

1. A storage device for a POS, the storage device being connected to a SATA connector that operates in conjunction with a control unit of the POS, comprising;
    a case part including a circuit board in which a first arrangement area and a second arrangement area spaced apart from each other are formed;
    a first storage module disposed in the first arrangement area and a second storage module disposed in the second arrangement area;
    a storage module coupling part including a first storage module coupling part coupled to the first storage module and a second storage module coupling part coupled to the second storage module;
    a main coupling part disposed at one end of the case part, the main coupling part electrically connected to the SATA connector; and
    a data circuit unit disposed between the main coupling part and the storage module coupling part, the data circuit unit including a first data circuit unit and a second data circuit unit,
    wherein data input to the POS is transmitted to and received from one or more of the first storage module or the second storage module through the main coupling part, the data circuit unit, and the storage module coupling part,
    wherein the main coupling part includes a first main coupling part configured to transceive first data between the first storage module coupling part and the control unit of the POS and a second main coupling part configured to transceive second data between the second storage module coupling part and the control unit of the POS,
    wherein the SATA connector includes a first SATA connector comprising a plurality of first connector pins and a second SATA connector comprising a plurality of second connector pins,
    wherein all of the plurality of first connector pins are coupled to the first main coupling part and a partial number of the plurality of second connector pins are coupled to the second main coupling part
    wherein the first main coupling part electrically connected with the first SATA connector is electrically coupled with the first storage module via the first data circuit unit and the first storage module coupling part, and
    wherein the second main coupling part electrically connected with the second SATA connector is electrically coupled with the second storage module via the second data circuit unit and the second storage module coupling part.

2. A POS system comprising:
    an input/output unit configured to input a signal and output information;
    a control unit configured to control for transmitting and receiving of data and process the data;
    a storage device configured to store the data transmitted to and received from the control unit; and
    a SATA connector configured such that the storage device is detachably connected thereto and the data processed by the control unit is transmitted to and received from the storage device,
    wherein the storage device includes
    a case part including a circuit board in which a first arrangement area and a second arrangement area spaced apart from each other are formed,
    a first storage module disposed in the first arrangement area and configured to store first data, and a second storage module disposed in the second arrangement area and configured to store second data,
    a storage module coupling part including a first storage module coupling part coupled to the first storage module and a second storage module coupling part coupled to the second storage module;
    a main coupling part disposed at one end of the case part, the main coupling part electrically connected to the SATA connector, and
    a data circuit unit disposed between the main coupling part and the storage module coupling part, the data circuit unit includes a first data circuit unit and a second data circuit unit,
    wherein the main coupling part includes a first main coupling part configured to transceive the first data between the first storage module coupling part and the control unit of the POS and a second main coupling part configured to transceive the second data between the second storage module coupling part and the control unit of the POS,
    wherein the SATA connector includes a first SATA connector comprising a plurality of first connector pins and a second SATA connector comprising a plurality of second connector pins,
    wherein all of the plurality of first connector pins are coupled to the first main coupling part and a partial number of the plurality of second connector pins are coupled to the second main coupling part wherein the first main coupling part electrically connected with the first SATA connector is electrically coupled with the first storage module when via the first data circuit unit and the first storage module coupling part, and wherein the second main coupling part electrically connected with the second SATA connector is electrically coupled with the second storage module via the second data circuit unit and the second storage module coupling part.

3. The POS system of claim 2, wherein the control unit includes:

a central processing unit configured to control the input/output unit and process the data; and an interface configured to generate a signal for transmitting and receiving the data to and from the storage device, the interface including a main interface configured to generate a first signal for transmitting and receiving the first data to be stored in the first storage module and an auxiliary interface configured to generate a second signal for transmitting and receiving the second data to be stored in the second storage module.

4. The POS system of claim 3, wherein the first SATA connector is connected to the main interface and is configured to transmit and receive the first data, and the second SATA connector is connected to the auxiliary interface and is configured to transmit and receive the second data.

5. The POS system of claim 4, wherein the first data is transceived between the main interface and the first storage module through the first SATA connector and the first main coupling part, and the second data is transceived between the auxiliary interface and the second storage module through the second SATA connector and the second main coupling part.

* * * * *